P. M. ANDERSON.
LIQUID WEIGHER.
APPLICATION FILED MAR. 23, 1916.

1,256,193.

Patented Feb. 12, 1918.
3 SHEETS—SHEET 1.

Witness
Daniel Webster, Jr.

Inventor
Peter M. Anderson
By Francis T. Chambers
his Attorney

P. M. ANDERSON.
LIQUID WEIGHER.
APPLICATION FILED MAR. 23, 1916.

1,256,193.

Patented Feb. 12, 1918.
3 SHEETS—SHEET 2.

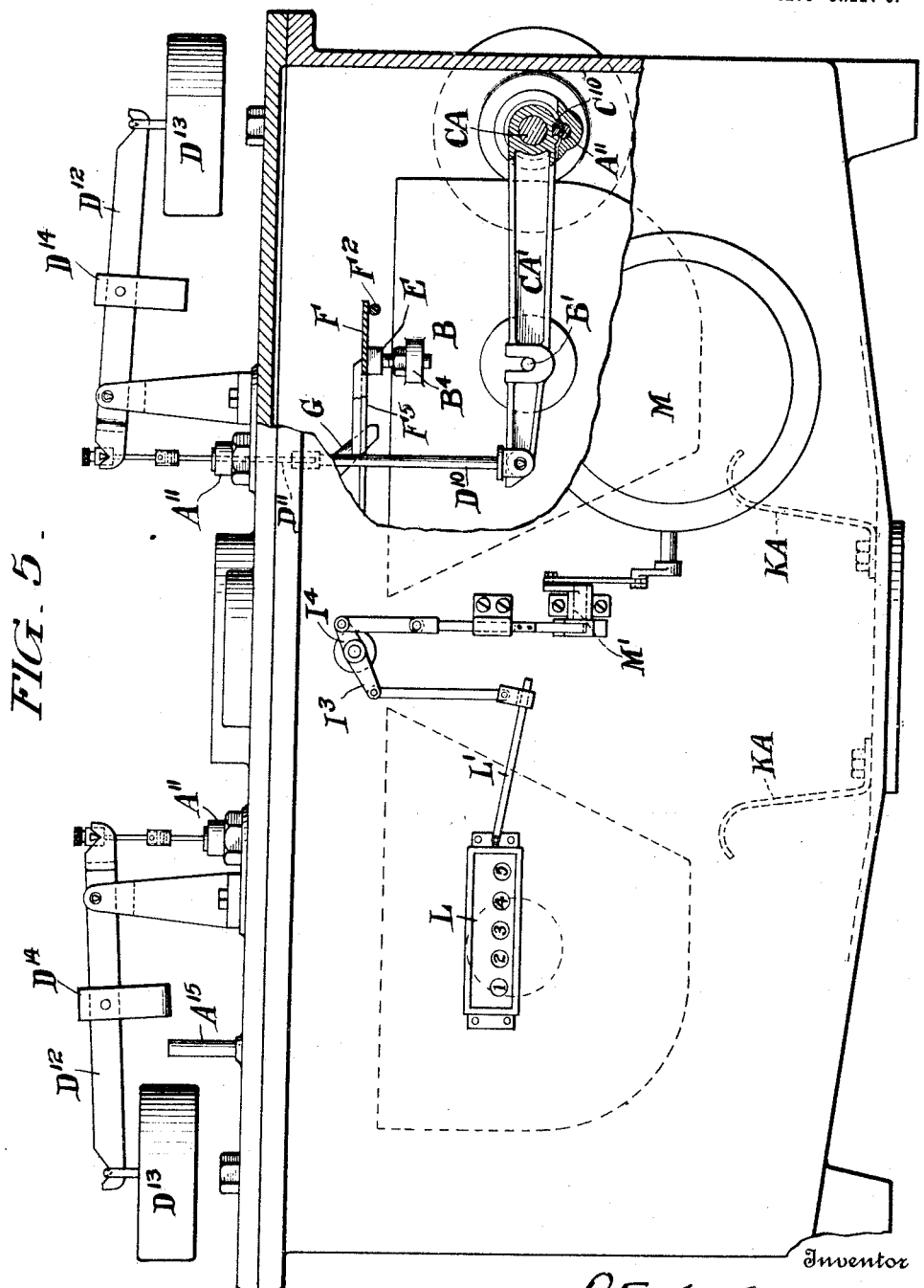

UNITED STATES PATENT OFFICE.

PETER M. ANDERSON, OF WASHINGTON, DISTRICT OF COLUMBIA.

LIQUID-WEIGHER.

1,256,193.  Specification of Letters Patent.  Patented Feb. 12, 1918.

Application filed March 23, 1916. Serial No. 86,324.

*To all whom it may concern:*

Be it known that I, PETER M. ANDERSON, a citizen of the United States of America, and a resident of Washington, in the District of Columbia, have invented a certain new and useful Improvement in Liquid-Weighers, of which the following is a true and exact description, reference being had to the accompanying drawings, which form a part thereof.

My present invention relates to liquid measuring apparatus of the kind in which the liquid to be measured is alternately discharged into buckets or receptacles each of which on receiving a predetermined weight of liquid automatically effects a diversion to the other bucket of the supply of liquid to be measured, and is itself discharged.

The object of my invention is to provide an improved measuring device of the type specified, characterized by its inherent simplicity and reliability, and the accuracy with which it operates, and also characterized by its relatively small bulk, and particularly by the relatively small headroom required. The latter consideration is of special importance in many cases when the measuring device is used for measuring water of condensation "returns" from steam heating systems, etc., a use for which my improved weigher is especially adapted.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described preferred embodiments of my invention.

Of the drawings:

Fig. 5 is an elevation taken similarly to Fig. 4 of a slightly modified form of my invention.

Figure 1:
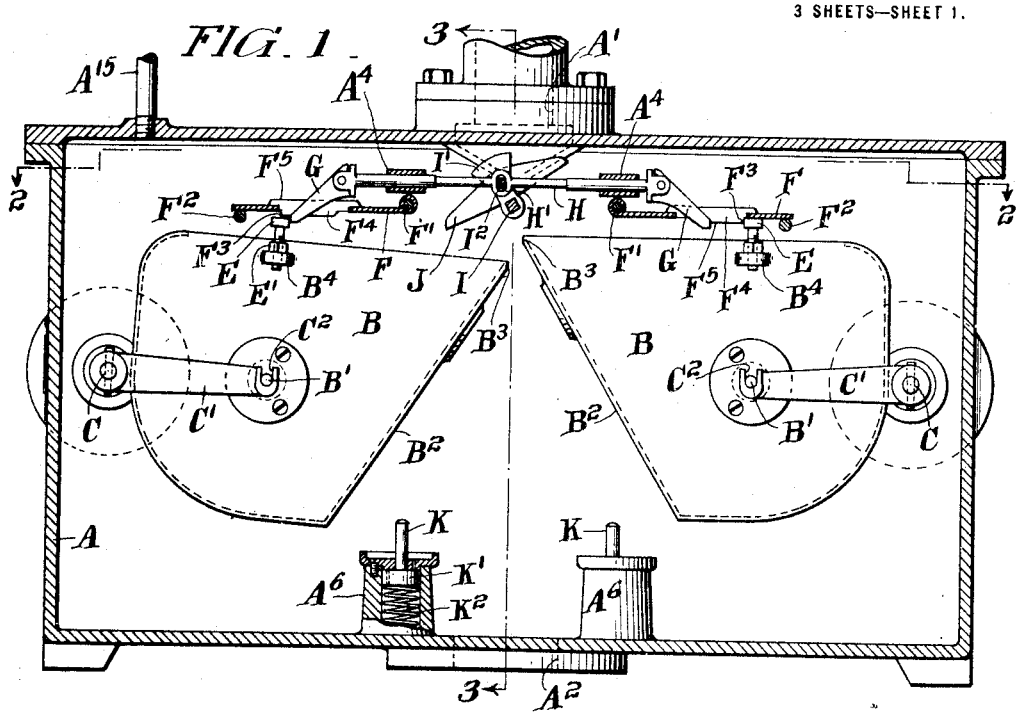
Figure 1 is a sectional elevation taken on the line 1—1 of Fig. 2.
Figure 2:
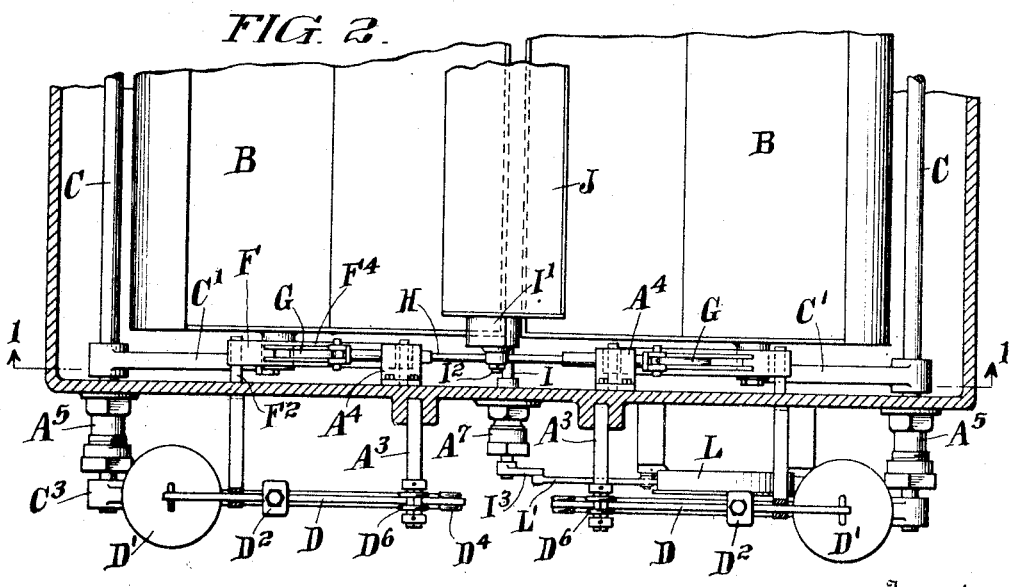
Fig. 2 is a sectional plan taken on the line 2—2 of Fig. 1.
Figure 3:
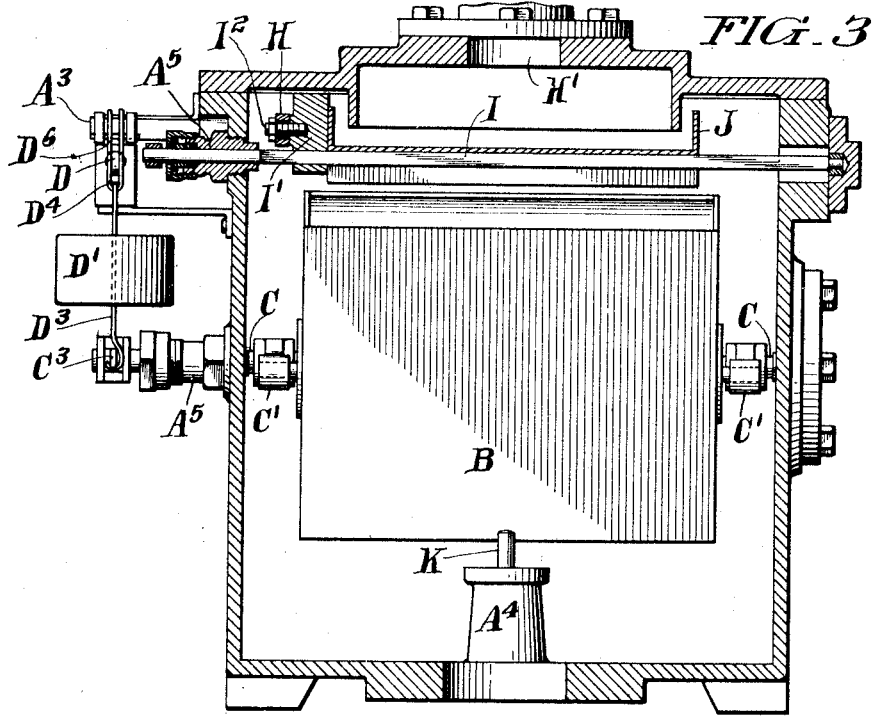
Fig. 3 is a sectional elevation taken on the line 3—3 of Fig. 1.
Figure 4:
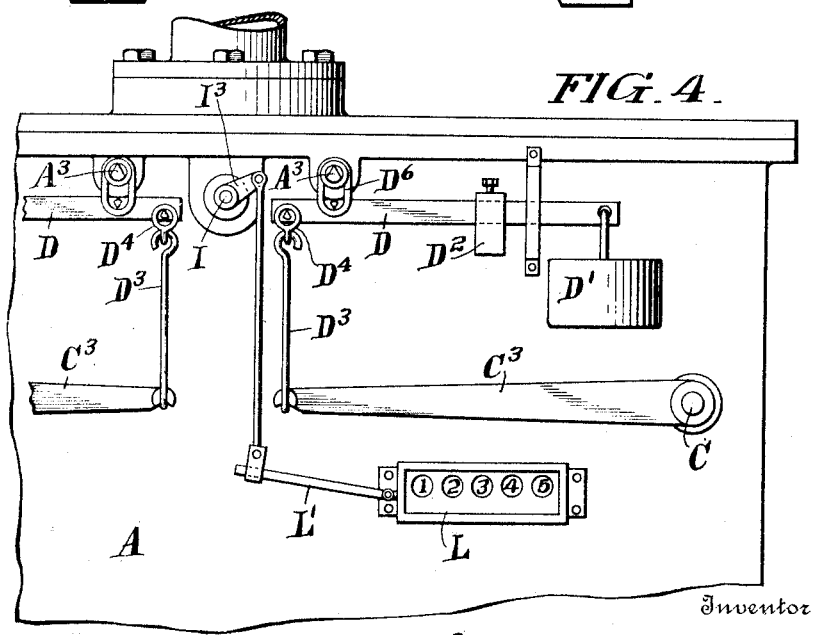
Fig. 4 is a partial end elevation of the apparatus.

In the drawings and referring first to the construction shown in Figs. 1 to 4 inclusive, A represents the casing or housing of the apparatus in which are located the two measuring receptacles B employed. Each measuring receptacle with the supporting provisions individual thereto is a duplicate of the other receptacle and the supporting provisions individual thereto. Each receptacle B is formed with trunnions B' at its ends which are received in open bearings $C^2$ formed in the ends of arms C' carried by a corresponding rock shaft C which is journaled in the housing and having one end projecting through one end wall of the latter, suitable stuffing boxes $A^5$ being provided for the projecting ends of the shafts C.

External of the housing each rock shaft C has secured to it an arm $C^3$ connected to a corresponding balancing mechanism. Each balancing mechanism, as shown, comprises a main balancing lever or scale beam D pivotally connected at one end by the links $D^3$ and $D^4$ to the free end of the corresponding arm $C^3$, and carrying at its other end a main counter-balancing weight D'. An adjustable counterpoise $D^2$ is also mounted on the lever D. The lever D is suspended between its ends by the links $D^6$ from the main supporting knife edge $A^3$. Preferably knife edge connections of the kind commonly employed in scale mechanisms are provided between the links $D^3$ and $D^4$ and between link $D^3$ and the arm $C^3$, and between the link $D^4$ and the lever D.

Each bucket B has an inclined front wall $B^2$ and is so proportioned that the bucket when empty tends to turn about the axis of the trunnions B' so as to carry the upper edge or discharge lip $B^3$ of the bucket somewhat higher than the position occupied by this edge of the right hand bucket shown in Fig. 1. As the bucket fills, however, the center of gravity shifts so that the bucket tends to swing into the position in which the inclined wall engages the corresponding cushion stop K.

While being filled each bucket B is held in the filling position which is that occupied by the right hand bucket in Fig. 1, by the engagement of a projection E from the bucket with a corresponding latch member F. Each latch member F is pivotally mounted at one end on a supporting stud F' secured to the housing and at its other end is supported and held from turning downward from a horizontal position by a pin $F^2$. The projection E normally engages a shoulder $F^3$ of the latch F so that when the center of gravity of the bucket with its contents changes as the bucket fills, the bucket is held against tilting movement until its increasing weight effects the release of the bucket as hereinafter explained. As shown, the projection E is in the form of a bolt threaded through an ear $B^4$ secured to the end of the bucket and adjustably secured to the bucket by means of the lock nut E'.

When the predetermined amount of liquid has entered a bucket B, the increased weight, which is determined by the adjustment of the balancing mechanism, causes the corresponding rock shaft C to turn sufficiently so that the corresponding projection E is carried below the shoulder $F^3$ of the corresponding latch F, (see left hand of Fig. 1). When this occurs the bucket is free to tilt about the axis of its trunnion connection with the supporting arms C', and turns into the discharge position in which the inclined wall $B^2$ of the bucket engages a suitable stop K which is preferably of a character to prevent unnecessary jar and noise in the operation of the apparatus. The stop K provided for this purpose is in the form of a plunger rod carried by a piston K' working in a sort of a dash pot chamber $A^6$ formed as a part of the housing and containing a spring $K^2$ working against the under side of the piston K' and tending to hold the plunger in its elevated position.

As each filled bucket starts to tilt into the discharge position its stop E strikes a corresponding one of a pair of arms G pivotally connected as shown to the opposite ends of a reciprocating element H which works in guide ways $A^3$ formed in the housing A and controls the position of the chute or deflecting device J employed to direct the water entering the housing A through the passage A' into the bucket to be filled, and away from the bucket which is discharging. Each arm G works in a slot $F^4$ formed in the corresponding latch lever F and the latter is formed with guide flanges $F^5$ at each side of its slot $F^4$. The deflecting device J is carried by a rock shaft I journaled in the housing, and an arm I' secured to the shaft I is provided with a pin working in a slot formed in the reciprocating element H. Preferably the arm I' is made heavy enough so that when its center of gravity is moved over the axis of the shaft I, its weight assists in completing the movement of the deflector into its new position.

As soon as the bucket which has turned into the discharging position empties, it is returned to its initial position to receive water when the other bucket is filled and by tilting out of the receiving position shifts the deflector J into the position to discharge into the empty bucket. In the return movement of the empty bucket, the bucket is bodily lifted by the arms I under the action of the balancing mechanism and the bucket also turns about the axis of its trunnion connection because of the change in the center of gravity of the bucket. As the bucket turns into the receiving position, the projection E successively engages the lever G and the stop shoulder $F^3$ on the member F and these parts turn about their pivotal connections to permit the projection E to be moved back into place. Undesirable overtravel of the empty receptacle on its return movement is prevented by the corresponding pin $F^2$ which extends across the path of the projection E.

The rock shaft I extends out of the housing A through the stuffing box $A^7$ and externally of the housing carries an arm $I^3$ link connected to the operating arm L' of a suitable counter L which is thus actuated to register the number of times the buckets fill and empty, and thereby furnishes a registration of the amount of liquid passing through the apparatus. It is to be noted that while a brief time interval is required for the movement of the filled bucket toward the emptying position sufficient to effect the oscillation of the deflector or distribution controlling element J during which water is received by the filled bucket, the quantity of water thus received does not vary greatly with variations in the rate at which water is passing to the apparatus through the inlet A' because the impact of the water discharged into the bucket effects a more rapid tilting movement of the bucket when the water is supplied at a rapid rate than when it is supplied less rapidly.

When the balancing mechanism is located externally of the bucket housing as is desirable though not essential in many cases, the stuffing boxes $A^5$ for the projecting ends of the shaft C offer a frictional resistance to the tilting of the buckets B which is avoided with the construction shown in Fig. 5 wherein the rock shafts CA, corresponding generally to the rock shafts C of the construction first described, lie wholly within the housing and are journaled therein by means of the knife edges $C^{10}$ working on the bearing block $A^{11}$. In Fig. 5 one of the arms CA', corresponding to the arm C' of the construction first described, is connected by the vertical rod $D^{10}$ and the extension $D^{11}$ jointed thereto and passing through the top wall of the housing to the balancing mechanism which in this case is located on the top of the housing and comprises a suitable fulcrumed balancing lever $D^{12}$, a main counterweight $D^{13}$, and an adjustable poise $D^{14}$. The stuffing boxes $A^{11}$ through which the rods $D^{11}$ pass, on account of the small diameter which the latter may have, need exert a frictional resistance to the operation of the apparatus which is but a small fraction of that due to the stuffing boxes A⁵ for the rock shafts C in the construction first described.

Aside from the main differences already noted the construction shown in Fig. 5 differs from that shown in Figs. 1 to 4 in that the stops K of the construction shown in Figs. 1 to 4 are replaced in Fig. 5 by spring arms KA; and in that in Fig. 5 the outer end of the rock shaft I carries in addition to the arm I³ connected to the register L, a second arm I⁴ connected through suitable connecting rods and a crank shaft M', to a recording device M to give a cartographic record of the amount of liquid passing through the apparatus.

With either form of apparatus disclosed the frictional and other resistance to the tripping of each receptacle and its turning movement into the discharge position when filled with the proper amount of liquid is relatively small and is of such a character that it interferes very slightly with the accuracy of the apparatus. Inasmuch as the receptacles B do not engage the arms G until after the receptacles have tilted and an initial movement toward the discharge position has occurred, the arms G and connected parts do not interfere at all with the tripping of the receptacles B when filled with the proper amount of liquid, and the momentum acquired by each receptacle B in its slight initial movement after being tripped and before engaging the corresponding arm G is utilized in effecting the corresponding shift of the arms G and connected parts.

While in accordance with the provisions of the statutes I have illustrated and described the best forms of my invention now known to me, it will be apparent to those skilled in the art that changes can be made in the form of my invention without departing from its spirit, and that some features of my invention can be used without a corresponding use of other features of the invention.

Having now described my invention, what I claim as new and desire to secure by Letters Patent, is:

1. In a liquid weigher, a balancing mechanism including a movable support, a liquid receptacle pivotally connected to said support and tending to turn into a discharge position when filled and to turn back into a receiving position when empty, said balancing mechanism normally holding the receptacle in an elevated position but yielding to permit the receptacle to be lowered when filled, a stop operative to prevent the receptacle from turning into its discharge position when the receptacle is elevated but permitting such turning when the receptacle is lowered and means controlling the supply of liquid in said receptacle comprising an operating arm struck and actuated by the receptacle during an intermediate portion of the turning movement of the latter from its receiving to its discharge positions.

2. In a liquid weigher, a rocking support pivoted to turn about a horizontal axis, a liquid receptacle pivotally connected to said support to turn with respect thereto about a horizontal axis and tending to turn about the latter into a discharge position when filled and back into a receiving position when empty, a balancing mechanism engaging said support and normally holding the receptacle axis in an elevated position but yielding to permit the axis to be lowered when the receptacle is filled, a stop effective to prevent the receptacle from turning out of its receiving position when the receptacle is elevated but rendered ineffective by the lowering of the receptacle axis, and means controlling the supply of liquid to said receptacle comprising an operating arm struck and actuated by the receptacle at the end of a partial initial portion of the turning movement of the receptacle from its receiving to its discharge positions.

3. In a liquid weigher a pair of liquid receptacles, a separate balancing mechanism for each receptacle to which the latter is pivotally connected, each receptacle being adapted when empty to turn into an upright position and when filled to turn into a discharge position, the discharge turning movements of the two receptacles being opposite in direction, means normally effective to maintain each receptacle in its upright position but rendered ineffective by the yielding of the balancing mechanism when the weight of the filling receptacle increases to a predetermined point, and liquid control means alternately engaged and shifted in opposite directions by said receptacles during their turning discharge movements.

4. In a liquid weigher a pair of liquid receptacles, a separate balancing mechanism for each receptacle to which the latter is pivotally connected, each receptacle being adapted when empty to turn into a discharge position, the discharge turning movements of the two receptacles being opposite in direction, means normally effective to maintain each receptacle in its upright position but rendered ineffective by the yielding of the balancing mechanism when the weight of the filling receptacle increases to a predetermined amount, and liquid control means including an actuating member alternately struck and shifted in opposite directions by said receptacles during their turning discharge movements.

5. In a liquid weigher, a pair of rocking supports mounted to turn about parallel horizontal axes, a pair of receptacles pivotally connected between said axes one to one and the other to the second of said supports and each tending when filled to turn toward the other into a discharge position and when empty to turn back into a receiving position, a separate balancing mechanism connected to each support and tending to hold the corresponding receptacle in an elevated position, means normally effective to prevent each receptacle from turning out of its receiving position but rendered ineffective to restrain the receptacle by the lowering of the latter and liquid control means alternately struck and shifted in opposite directions by said receptacles during their discharge movement.

6. In a liquid weigher, a pair of rocking supports mounted to turn about parallel horizontal axes, a pair of receptacles pivotally connected between said axes one to one and the other to the second of said supports and each tending when filled to turn toward the other into a discharge position and when empty to turn back into a receiving position, a separate balancing mechanism connected to each support and tending to hold the corresponding receptacle in an elevated position, a pivoted catch member for each receptacle normally preventing the latter from turning out of its receiving position but rendered ineffective by the lowering of the receptacle, and yielding to permit the return movement of the receptacle, and liquid control means alternately struck and shifted in opposite directions by said receptacles during their discharge movement.

7. In a liquid weigher, a housing, a pair of rocking supports journaled therein to turn about parallel horizontal axes, a pair of receptacles each pivotally connected between said axes, one to one and the other to the second of said supports and each tending when filled to turn toward the other into a discharge position and when empty to turn back into a receiving position, means normally effective to maintain each receptacle in its receiving position but rendered ineffective by the turning of the corresponding support to lower the receptacle carried thereby, a balancing mechanism for each support located externally of the housing, an operating connection between each balancing mechanism and the corresponding support extending through the housing wall, liquid control means comprising a deflector mounted on a rock shaft projecting through the housing wall and an actuating member movable transversely of said axis and adapted to be alternately engaged and shifted in opposite directions by said receptacles as they alternately turn into the discharge position, and exhibiting means external of the housing and actuated by the projecting end of said shaft.

8. In a liquid weigher a pair of rocking supports mounted to turn about parallel horizontal axes, a pair of receptacles pivotally connected between said axes one to one and the other to the second of said supports and each tending when filled to turn toward the other into a discharge position and when empty to turn back into a receiving position, a separate balancing mechanism connected to each support and tending to hold the corresponding receptacle in an elevated position, means normally effective to maintain each receptacle in its receiving position but rendered ineffective by the lowering of the filled receptacle, and liquid control means including an actuating member movable transversely of said axes and comprising a pair of pawls each adapted to be engaged and to actuate said member on the movement of the corresponding receptacle into its discharge position and to be engaged and to yield without operating said element on the return movement of the receptacle into its receiving position.

9. In a liquid weigher, a housing, a pair of rocking supports journaled therein to turn about parallel horizontal axes, a pair of receptacles each pivotally connected between said axes, one to one and the other to the second of said supports and each tending when filled to turn toward the other into a discharge position and when empty to turn back into a receiving position, means normally effective to maintain each receptacle in its receiving position but rendered ineffective by the turning of the corresponding support to lower the receptacle carried thereby, a balancing mechanism for each support located externally of the housing, an operating connection between each balancing mechanism and the corresponding support extending through the housing wall, liquid control means comprising an actuating member located in said housing and adapted to be alternately engaged and shifted in opposite directions by said receptacles as they alternately turn into the discharge position.

10. In a liquid weigher, a pair of rocking supports mounted to turn about parallel horizontal axes, a pair of receptacles pivotally connected between said axes one to one and the other to the second of said supports and each tending when filled to turn toward the other into a discharge position and when empty to turn back into a receiving position, a separate balancing mechanism connected to each support and tending to hold the corresponding receptacle in an elevated position, means normally effective to maintain each receptacle in its receiving position but rendered ineffective by the lowering of the filled receptacle, and liquid control means including an actuating member movable transversely of said axes and alternately struck and shifted in opposite directions by said receptacles during their discharge movements and a pivoted liquid deflector connected to said actuating member.

11. In a liquid weigher of the tilting receptacle type the combination of a rocking support turning about a horizontal axis, a tilting receptacle pivotally connected to said support at one side of said axis, balancing mechanism connected to said support, and means for holding said receptacle in its receiving position during the filling operation comprising an adjustable part secured to the receptacle and a pivoted catch supported independently of said receptacle.

12. In a liquid weigher the combination with a housing of a rocking support journaled within said housing to turn about a horizontal axis, a liquid receptacle pivotally connected to said support within said housing, balancing mechanism external of said housing, an operating connection between said balancing mechanism and the receptacle extending through the housing wall and stuffing box provisions for preventing leakage out of the housing along said connection.

PETER M. ANDERSON.

Copies of this patent may be obtained for five cents each, by addressing the "Commissioner of Patents, Washington, D. C."